United States Patent [19]

Anderson, deceased et al.

[11] Patent Number: 4,809,961

[45] Date of Patent: Mar. 7, 1989

[54] MULTIPLE WORKPIECE POSITIONING FIXTURE

[76] Inventors: Carl A. Anderson, deceased, late of Chicago; by Christine Anderson, legal representative, 1324 W. Henderson St., Chicago, both of Ill. 60657

[21] Appl. No.: 53,571

[22] Filed: May 21, 1987

Related U.S. Application Data

[63] Continuation of Ser. No. 681,196, Dec. 13, 1984, abandoned.

[51] Int. Cl.⁴ .............................................. B23Q 3/18
[52] U.S. Cl. ........................................... 269/61; 269/66
[58] Field of Search .................... 269/58, 61, 63, 66, 269/68, 254 R, 287, 903, 296

[56] References Cited

U.S. PATENT DOCUMENTS

| | | | |
|---|---|---|---|
| 625,007 | 5/1899 | Wollman | 269/254 R |
| 1,468,397 | 9/1923 | Radke et al. | 269/61 |
| 2,512,636 | 6/1950 | Flynt | 269/61 |
| 2,707,819 | 5/1955 | Sillman | 269/68 |
| 3,022,066 | 2/1962 | Benes | 269/61 |

*Primary Examiner*—Frederick R. Schmidt
*Assistant Examiner*—Judy J. Hartman

[57] ABSTRACT

A fixture holds a workpiece in a plurality of orientations. The fixture is operable to flip the workpiece into a plurality of positions for work to be performed thereon. Each workpiece is mounted at the end of the spindle and secured thereat by a workpiece holder which takes a variety of forms depending on the size and shape of the workpiece.

20 Claims, 3 Drawing Sheets

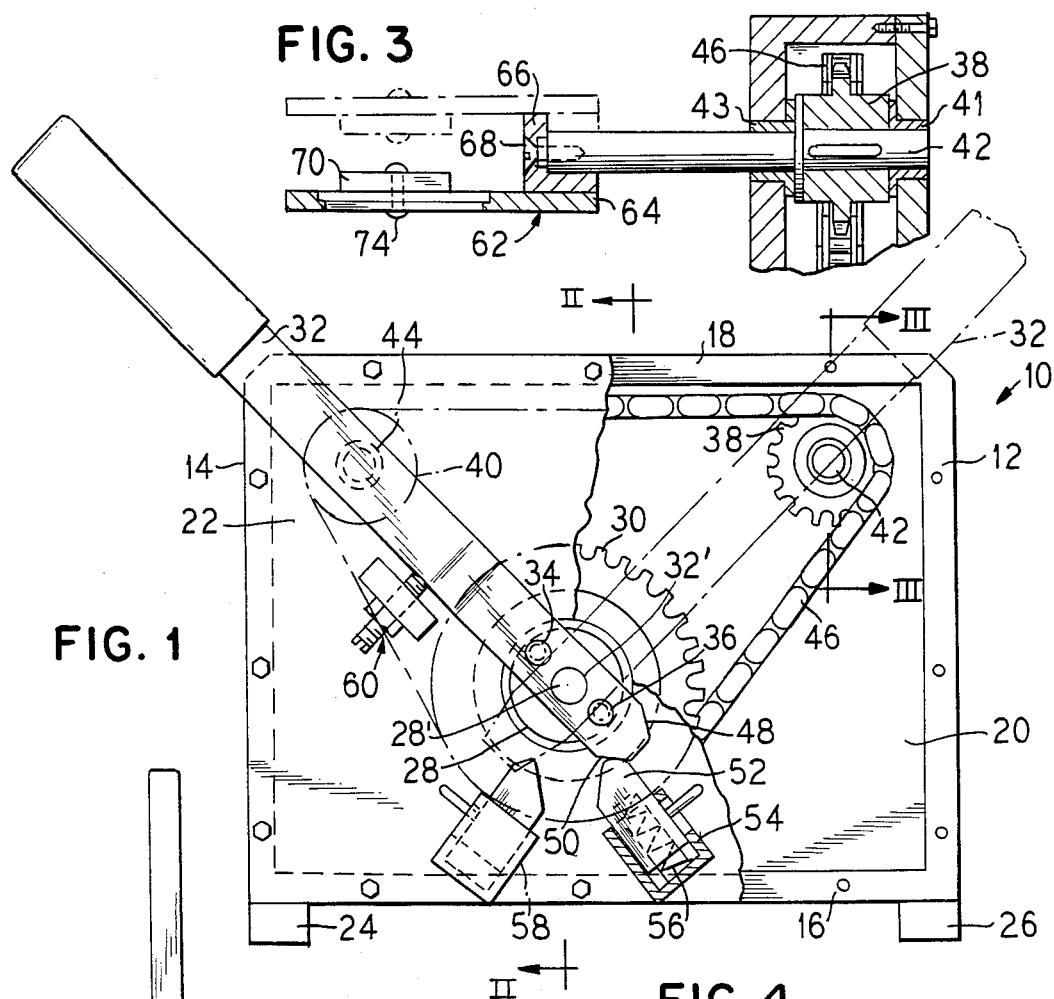
FIG. 3
FIG. 1
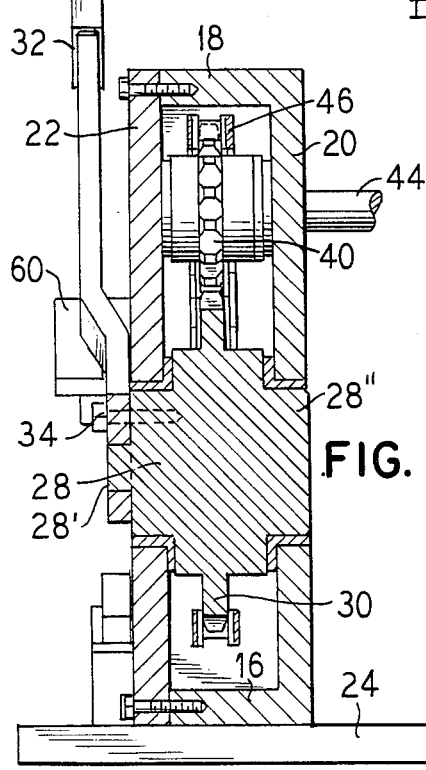
FIG. 2
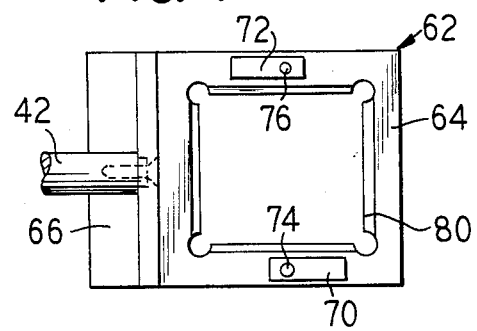
FIG. 4
FIG. 5

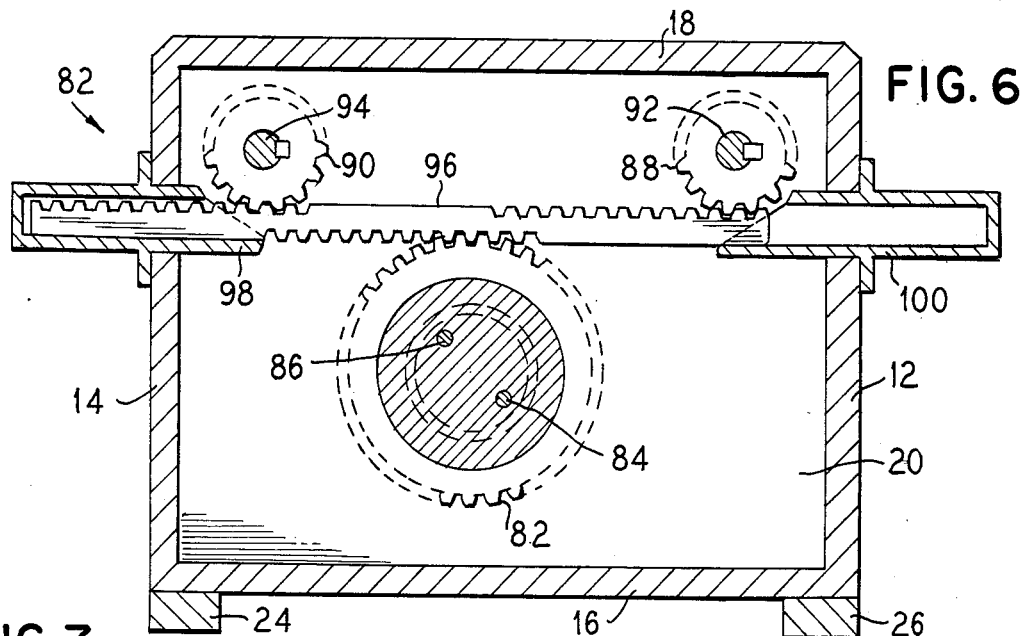
FIG. 6
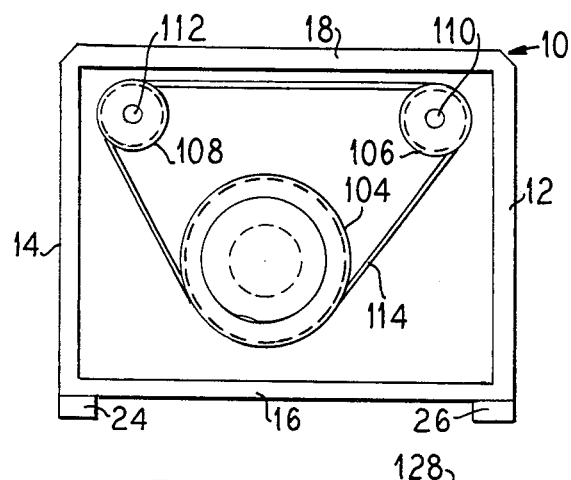
FIG. 7
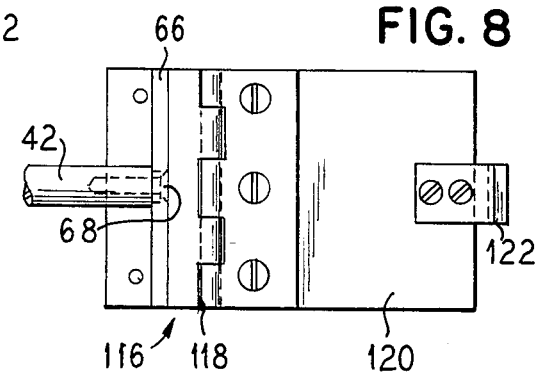
FIG. 8
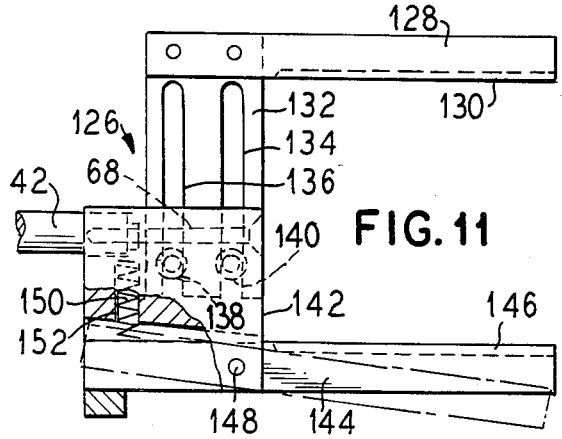
FIG. 11
FIG. 9
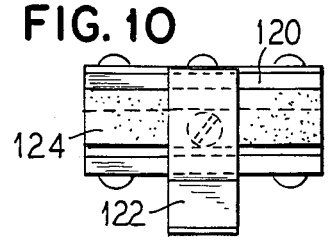
FIG. 10
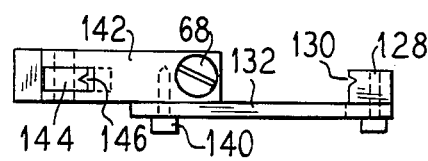
FIG. 12

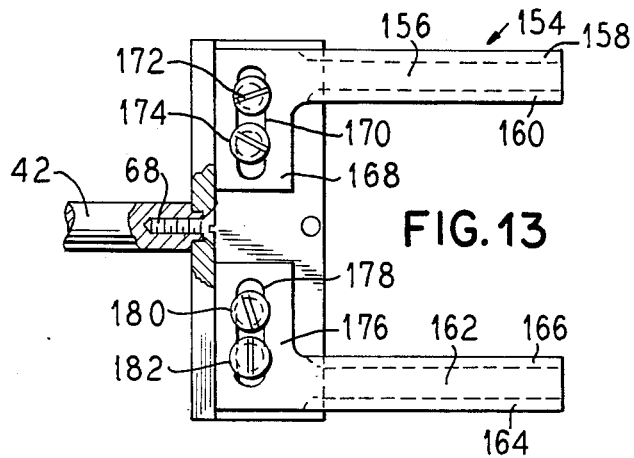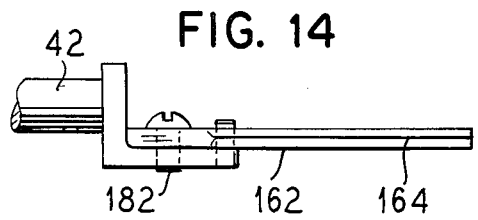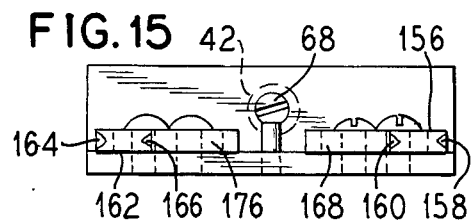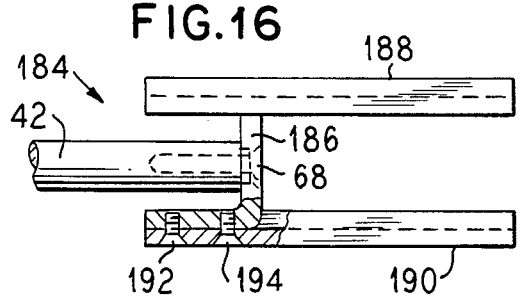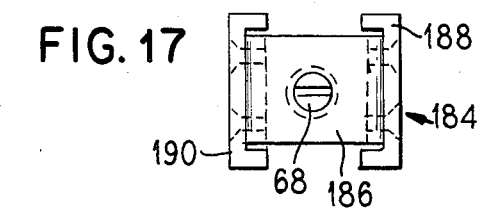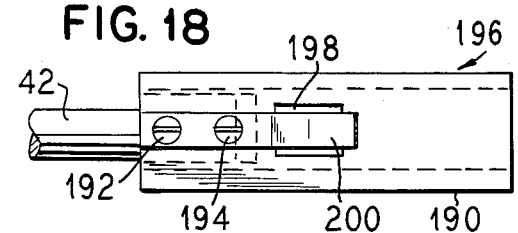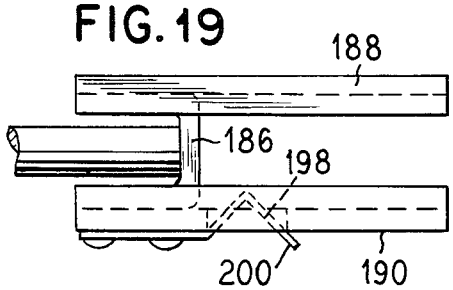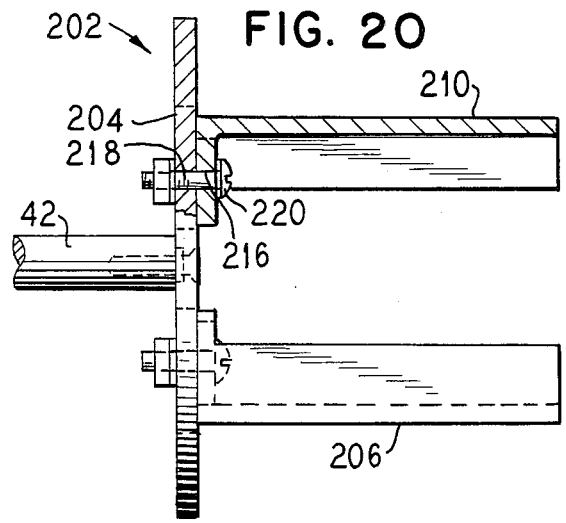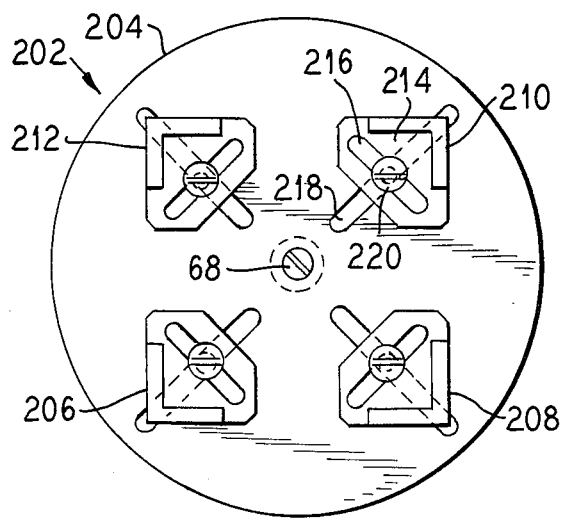

MULTIPLE WORKPIECE POSITIONING FIXTURE

This is a continuation of application Ser. No. 681,196, filed Dec. 13, 1984 now abandoned.

DISCLOSURE DOCUMENT

This invention was disclosed in Disclosure Docket No. 125,093, filed Feb. 29, 1984 with the United States Patent and Trademark Office.

BACKGROUND OF THE INVENTION

1. Field of the Invention

The present invention relates to a fixture for holding and positioning a plurality of workpieces in a plurality of predetermined positions.

2. Description of the Prior Art

Fixtures for holding workpieces are well known in the art. For example, the Matrix Engineering Corp. of Gardena, Calif. 90247 manufactures a plurality of fixtures for holding and/or positioning circuitboards, harness, diagrams and the like. These fixtures, however, employ positioning clamps, much in the manner of a camera tripod, which must be released for repositioning of a workpiece and reclamped after the workpiece is in a desired position.

SUMMARY OF THE INVENTION

The object of the present invention is to provide a workpiece holding and positioning fixture for positioning a plurality of workpieces in a plurality of predetermined positions without requiring clamping and unclamping of the operating mechanism each time there is a repositioning of the workpieces.

The above object is achieved through the provision of a housing which mounts a plurality of spindles in a spaced, generally parallel, relationship with respect to one another. The spindles are connected to a drive mechanism which rotates the spindles to predetermined circumferential positions. Operation of the drive mechanism is by way of a simple lever and the drive mechanism itself may comprise a plurality of sprockets entrained with a drive chain, a rack and pinion mechanism or a plurality of pulleys entrained with a cable.

Each of the spindles mounts a respective holder which is constructed in accordance with the dimensions of the workpiece and the type of operation to be performed on the workpiece. For example, a circuitboard may be held by its edges on an open frame so that work can be performed on both sides of the board as the same is flipped from one position to another.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a rear elevation, shown partially broken away, of an exemplary embodiment of the invention;

FIG. 2 is a sectional view taken substantially along the parting line II—II of FIG. 1;

FIG. 3 is a fragmentary sectional view taken substantially along the parting line III—III of FIG. 1, and further showing, also partially in section, a particular workpiece holder;

FIG. 4 is a top plan view of the workpiece holder of FIG. 3;

FIG. 5 is an end view of the workpiece holder of FIG. 3;

FIG. 6 is a sectional elevation of another embodiment of the invention in which the drive mechanism utilizes a rack and pinion structure;

FIG. 7 is a sectional elevation of another embodiment of the invention in which the drive utilizes pulleys and a cable;

FIG. 8 is a top plan view of another workpiece holder which may be employed in practicing the present invention;

FIG. 9 is a side view of the workpiece holder of FIG. 8;

FIG. 10 is an end view of the workpiece holder of FIG. 8;

FIG. 11 is a top plan view of another workpiece holder which may be employed in practicing the present invention;

FIG. 12 is an end view of the workpiece holder of FIG. 11;

FIG. 13 is a top plan view of another workpiece holder which may be employed in practicing the present invention;

FIG. 14 is an elevation of the workpiece holder of FIG. 13;

FIG. 15 is an end view of the workpiece holder of FIG. 13;

FIG. 16 is an elevation of another workpiece holder which may be employed for practicing the present invention;

FIG. 17 is an end view of the workpiece holder of FIG. 16;

FIG. 18 is an elevation of another workpiece holder which may be employed in practicing the present invention;

FIG. 19 is a top plan view of a workpiece holder of FIG. 18;

FIG. 20 is an elevation of a workpiece holder, shown partially in section, which may be employed in practicing the present invention; and FIG. 21 is an end view of the workpiece holder of FIG. 20.

DESCRIPTION OF THE PREFERRED EMBODIMENTS

Referring to FIGS. 1-3, a first embodiment of the invention is generally illustrated at 10 as comprising a housing including a pair of end walls 12, 14, a bottom wall 16, a top wall 18, a front wall 20 and a rear wall 22. A pair of feet 24 and 26 are connected to the bottom wall 16 for support of the fixture and may, if necessary, be secured to a work bench or the like.

A hub 28 carrying a smaller diameter of extension 28' rotatably secures, along with a hub 28", a gear 30 for rotation in the rear wall 22 and the front wall 20. An elongate handle 32 includes an aperture 32' which receives the hub extension 38' and the handle 32 is secured to the hub 28 by way of a pair of screws 34, 36.

A pair of sprockets 38, 40 are mounted for rotation, such as at 41 and 43 in FIG. 3 and connected to rotate respective shafts 42, 44. Although only two such shafts have been illustrated here for reasons of simplicity, a greater plurality of such shafts can be provided. The sprockets 30, 38 and 40 are entrained with a chain 46 so that rotation of the handle 32 causes a corresponding rotation of the sprockets and thus, of the shafts 42, 44.

Although a single stop 60 is illustrated for the handle 32, a similar stop would, of course, be provided for the opposite position of the handle. In the alternative, a series of ratchet-type detents could be provided on the rear wall to define a plurality of rotary positions of the shafts.

In order to maintain the workpieces in a fixed position upon operation of the handle, an end of the handle is provided with a pair of cams 48, 50 which are held in place by and operate a cam follower 52 mounted in a holder 54 and biased by a spring 56. A similar structure 58 is illustrated for the opposite position of the handle.

Referring to FIGS. 3, 4 and 5, a workpiece holder is illustrated at 62 as comprising an open frame 64 connected to an L-shaped member 66 which is secured to the end of the shaft 42 by way of a key and screw 68, which adapts the fixture for a plurality of different types of workpiece holders. The frame 64 may be provided with a plurality of members 70,72 and rotatably secured thereto by way of respective fasteners 74, 76 to hold a workpiece against the frame. As illustrated in FIGS. 3 and 5, the workpiece holder may be flipped, as at 78, so as to rotate 180° so that work may be done on both sides of a workpiece, such as a circuitboard.

The frame 64 may also be provided with a recess 80 for accurately positioning a workpiece thereon.

Referring now to FIG. 6, another embodiment of the invention is illustrated at 82. This embodiment is constructed in the same manner as the embodiment of FIGS. 1-3 with the exception of the drive mechanism. Here, a gear 82 is rotatably mounted between the front wall 20 and the rear wall 22 (not shown) and has a handle (not shown) secured thereto by way of screws 84, 86.

A pair of gears 88, 90 are also rotatably secured to the housing, as in FIGS. 1-3, to rotate respective spindles 92, 94.

The gears 88, 90 are entrained with the gear 82 by way of a rack 96 so as to form a rack and pinion mechanism. The rack 96 is held in place and guided at its ends by a pair of hollow guides 98, 100 which are secured to the end walls 14 and 12.

Referring to FIG. 7, yet another embodiment of the invention is illustrated which has the same basic structure of FIGS. 1-3 and FIG. 6 with the exception that in FIG. 7 pulleys are employed. A pulley 104 and a pair of pulleys 106 and 108 are rotatably mounted to the housing and provided with an operating handle (not shown). The pulleys 106 and 108 are connected to rotate respective spindles 110, 112 and are entrained with the pulley 104 by a cable or drive belt 114.

Referring now to FIGS. 8, 9 and 10, another workpiece holder is illustrated as connected to a spindle 42. This workpiece holder 116 is the same as the workpiece holder 62 of FIGS. 3, 4 and 5 with the exception that here the L-shaped member 66 has a hinge 118 connecting it to a cover 120 which may be releasably secured to the frame 64 by way of a spring latch 122. This embodiment is useful for loading parts, such as components to be secured to a circuitboard and holding the same in position as the holder is flipped 180° for work on the underside of the board. In order to aid in holding the parts, such as electronic components, microchips and the like, a foam pad 124 may be carried by the door 120 to hold the components in a cushioned state.

Referring to FIGS. 11 and 12, another embodiment of a workpiece holder is illustrated at 126. This holder is useful with respect to planar devices, such as printed circuitboards. The holder 126 comprises an arm 128 having an elongate groove 130 therein for receiving one edge of a circuitboard. The arm 128 is connected by way of a member 132 to a member 142 which is secured to the spindle 42. The member 132 comprises a pair of elongate slots 134, 136 for receiving respective screws 140, 138 for adjusting the position of the arm 128 with respect to a further arm 144. The arm 144 also has an elongate groove 146 therein and is pivotally connected to the member 142 at a pivot pin 148. A spring 150, located in a bore 152, biases the arm 144 toward the arm 128 to hold the workpiece.

Referring now to FIGS. 13, 14 and 15, another embodiment of a workpiece holder is illustrated at 154 as comprising an arm 156 and an arm 162. The arm 156 comprises an outer recess 158 and the arm 162 comprises an outer recess 164 for receiving inner edges of a workpiece which should be held generally outside of the workpiece holder. The arm 156 also includes a recess 160 and the arm 162 also includes a recess 166 for holding the edges of a workpiece which is to be held between the arms, such as circuitboard.

The arm 156 is connected to a member 168 having an elongate slot 170 therein for receiving adjustment screws 172 and 174, while the arm 162 is connected to a member 176 having an elongate slot 178 for receiving adjustment screws 180 and 182, whereby the two arms may be adjusted towards and away from one another to accommodate different sizes of workpieces.

FIGS. 16 and 17 illustrate a workpiece holder 184 for holding a generally rectangular workpiece. The holder 184 comprises a member 186 for receiving the screw 68 to connect the holder to the spindle 42. In addition, the holder comprises a pair of U-shaped members 188, 190 which are secured to the member 186, as by screws 192, 194.

The workpiece holder 196 of FIGS. 18 and 19 is similar to that of FIGS. 16 and 17 and, for the most part, comprise the same elements so that similar reference characters are employed. The exception here is that the U-shaped member 190 includes an aperture 198 which has a holding spring 200 for the workpiece secured to the holder by the screws 192, 194.

FIGS. 20 and 21 illustrate a further embodiment of a workpiece holder which is adjustable with respect to the size of a rectangular workpiece. Here, a plurality of L-shaped members 206, 208, 210 and 212 each include an end member 214 having an elongate slot 216 therethrough. A mounting member 204 comprises a respective elongate slot 218 so that the slot 216 and 218 receive a screw 220 therethrough for adjusting the L-shaped members in orthogonal directions.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for holding and rotatably positioning a workpiece, comprising:

a workpiece holder comprising means for releasably holding a workpiece;

a spindle connected to said workpiece holder;

support means rotatably mounting said spindle;

drive means mounted to said support means and connected to said spindle for rotating said workpiece holder to predetermined rotary positions, via said spindle;
said drive means comprising:
first and second wheels rotatably mounted to said support means, said second wheel coaxially fixed to said spindle for mutual rotation;
a lever connected to said first wheel and movable to at least two predetermined positions defining work positions for said workpiece holder;
cam means on said lever for engaging stop means mounted on said support means to define said predetermined work positions; and
coupling means entraining said first and second wheels for simultaneous rotation in response to and upon movement of said lever.

2. The apparatus of claim 1, wherein said workpiece holder comprises:
a frame, including a central opening, for supporting a workpiece over said central opening, said means for releasably securing a workpiece carried by said frame; and
an attachment means for attaching said workpiece holder to said spindle.

3. The apparatus of claim 2, wherein said means for releasably securing a workpiece comprises:
at least one member pivotally mounted on said frame adjacent to and pivotal over said opening.

4. The apparatus of claim 2, wherein said frame further includes:
means defining a groove about said opening on one side of said frame for accurately locating a workpiece.

5. The apparatus of claim 2, and further comprising:
a door pivotally connected to said attachment means; and
a latch on said door for releasable engagement with said frame when said door is pivoted parallel to said frame to hold a plurality of workpieces therebetween.

6. The apparatus of claim 5, and further comprising a resilient pad carried by said door to prevent injury to workpieces.

7. The apparatus of claim 1, wherein said workpiece holder comprises:
a first arm carried by said attachment means for engaging a side of the workpiece;
a second arm carried by said attachment means spaced from said first arm for engaging an opposite side of the workpiece; and
adjustment means for adjusting the spacing between said first and second arms.

8. The apparatus of claim 7, and further comprising:
pivot means mounting said second arm to said attachment means to facilitate loading and unloading of the workpiece; and
spring means engaging said attachment means and said second arm to bias said second arm towards said first arm.

9. The apparatus of claim 7, wherein each of said arms comprises:
a groove for receiving a respective edge side of the workpiece.

10. The apparatus of claim 7, wherein:
each of said arms comprises a U-shaped cross-section so that the bases and the legs of each U may engage respective surfaces of a workpiece having a rectangular cross-section.

11. The apparatus of claim 10, wherein:
at least one of said arms comprises an aperture in the base of its U-shaped cross-section; and
a holding spring is mounted on said at least one arm and extends through said aperture to engage the respective side of the workpiece.

12. The apparatus of claim 1, wherein said means for releasably securing a workpiece comprises:
a plurality of arms, each comprising an L-shaped cross-section for engaging corners of a workpiece therebetween; and
attachment means for attaching said workpiece to said spindle carrying said arms.

13. The apparatus of claim 12, and further comprising:
adjustment means connecting said arms to said attachment means for adjusting said arms in at least two coordinate directions.

14. The apparatus of claim 1, wherein:
said first and second wheels are sprockets; and
said coupling means is a sprocket chain.

15. The apparatus of claim 1, wherein:
said first and second wheels are gears; and
said coupling means is a rack.

16. The apparatus of claim 1, wherein: said first and second wheels are pulleys; and said coupling means is a strand.

17. The apparatus of claim 1, wherein:
said first and second wheels are toothed pulleys; and
said coupling means is a toothed belt.

18. The apparatus of claim 1, and further comprising:
a pair of stop means mounted to define said two predetermined positions of said lever; and
a pair of yieldable holding means for engaging and releasably holding said lever at said two predetermined positions.

19. Apparatus for holding and rotatably positioning a plurality of workpieces, comprising:
a plurality of workpiece holders each including means for releasably holding a workpiece;
a plurality of spindles each connected to a respective workpiece holder;
support means rotatably mounting said spindles generally parallel one another; and
drive means connected to said support means and to said plurality of spindles and operable to rotate said plurality of workpiece holders, via said plurality of spindles, to predetermined positions of rotation;
said drive means comprising:
a first wheel and a plurality of second wheels rotatably mounted to said support means, one of said plurality of second wheels coaxially fixed to each of said spindles for mutual rotation;
a lever connected to said first wheel and movable to at least two predetermined positions defining work positions for said workpiece holder;
cam means on said lever for engaging stop means mounted on said support means to define said predetermined work positions; and
coupling means entraining said first wheel and said plurality of second wheels for simultaneous rotation in response to and upon movement of said lever.

20. The apparatus of claim 19, wherein said support means comprises:
a housing enclosing said first and second wheels.

* * * * *